Nov. 21, 1961   N. F. CERULLI   3,010,044
ELECTROLUMINESCENT CELL, METHOD AND CERAMIC COMPOSITION
Filed June 17, 1959

FIG. 1.

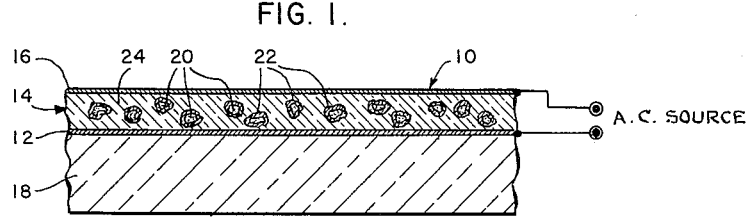

FIG. 2.

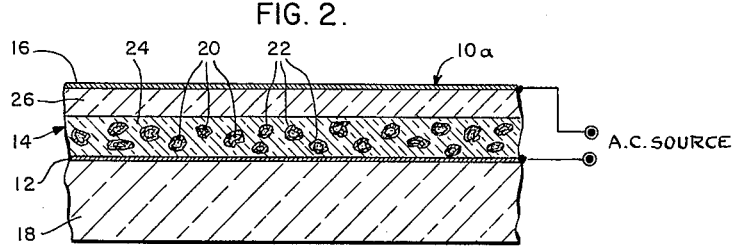

FIG. 3.

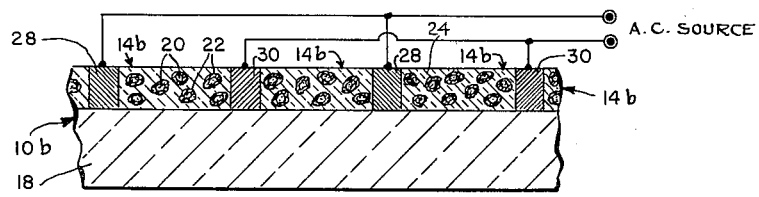

FIG. 4.

```
MIX FINELY-DIVIDED ELECTROLUMINESCENT
PHOSPHOR WITH CERAMIC MIX WHICH WILL
PRECIPITATE BARIUM TITANATE WHEN FIRED
```
↓
```
FIRE CERAMIC MIX AND MIXED PHOSPHORS
SO THAT BARIUM TITANATE DEPOSITS ABOUT
MIXED PHOSPHOR PARTICLES AND REMAINING
UNDEPOSITED CERAMIC MIX FORMS A CON-
TINUOUS PARTICLE-EMBEDDED CERAMIC LAYER.
```

INVENTOR
N. F. CERULLI.

BY *W. D. Palmer*
ATTORNEY 3,010,044
ELECTROLUMINESCENT CELL, METHOD
AND CERAMIC COMPOSITION
Nicholas F. Cerulli, Caldwell, N.J., assignor to Westinghouse Electric Corporation, East Pittsburgh, Pa., a corporation of Pennsylvania
Filed June 17, 1959, Ser. No. 820,925
5 Claims. (Cl. 313—108)

This invention relates to electroluminescent cells, method and glass composition and, more particularly, to electroluminescent cell structure, a method of making such a structure and a glass composition suitable for use in making the cell structure.

The phenomenon of electroluminescence was first disclosed by G. Destriau, one of his earlier publications appearing in London, Edinburgh and Dublin Philosophical Magazine, Series 7, volume 38, No. 285, pages 700–737 (October 1947). In the usual form of electroluminescent cell, finely-divided electroluminescent phosphor particles are embedded in dielectric material and are positioned between spaced electrodes. These electrodes can be formed of a wire mesh such as a screen or an interlacing raster-type grid mesh or the spaced electrodes can be formed of continuous, electrically-conducting material, such as a layer of tin oxide on a glass foundation. Such electroluminescent cell constructions are well known. In the operation of the cell, a potential is applied between the spaced electrodes and the resulting electric field causes the electroluminescent phosphor particles to emit light. In the usual case, the greater the intensity of the electric field which is applied across the phosphor particles, the greater the intensity of the resulting light emission. Thus to obtain best brightness, the electric field developed across the phosphor particles is maintained as intense as possible without risking electrical breakdown across the cell. In this regard it is desirable to embed the phosphor particles in a material which has as high a dielectric constant as possible since the electric field loss through the embedding dielectric material decreases with increasing dielectric constant of this material.

It has been disclosed in British Patent No. 765,076, published January 2, 1957, to incorporate an additional layer of titania or barium titanate between the electrodes of the electroluminescent cell. Titanium dioxide and barium titanate have a very high dielectric constant so that the electric field loss through this additional layer is very small. This additional layer of very high dielectric constant material increases the voltage at which the cell will break down, however, so that the effective field which is applied across the phosphor particles can be increased without risking an electrical breakdown. It would be desirable to increase still further the effective electrical field which is developed across the phosphor particles and with this as an objective, efforts have been made to embed the phophor particles directly in a continuous layer of barium titanate or titanium dioxide. These efforts have not been successful to date, however, as a continuous layer of embedding barium titanate or titanium dioxide becomes relatively opaque, thereby absorbing the visible light which is emitted by the phosphor.

It is the general object of the invention to avoid and overcome the foregoing and other difficulties of and objections to prior-art practices by the provision of an electroluminescent cell wherein increased light output can be obtained.

It is a further object to provide an electroluminescent cell wherein the electric field developed across individual phosphor particles in an electroluminescent cell can be increased.

It is another object to provide a glass composition suitable for depositing a layer of very high dielectric constant material around finely-divided impurity materials which are contained therein.

It is an additional object to provide a method for forming a light-transmitting phosphor-dielectric layer suitable for use in an electroluminescent cell wherein the electrical field which is applied across the electroluminescent phosphor particles can be increased.

The aforesaid objects of the invention, and other objects which will become apparent as the description proceeds, are achieved by providing an electroluminescent cell wherein finely-divided phosphor particles which are included between the cell electrodes are individually encased by light-transmitting material having a very high dielectric constant such as barium titanate, with the encased particles embedded in additional light-transmitting dielectric material. A glass composition suitable for use in preparing the phosphor-dielectric layer has been provided as well as a method for forming such a layer wherein the electroluminescent phosphor particles serve as impurity "seeds" about which barium titanate deposits.

For a better understanding of the invention, reference should be had to the accompanying drawings wherein:

FIG. 1 is a fragmentary sectional elevation of an electroluminescent cell wherein the embedded, finely-divided phosphor particles are individually encased by material having a very high dielectric constant;

FIG. 2 is an alternative embodiment of the cell structure as shown in FIG. 1 wherein an additional separate layer of material having a very high dielectric constant is also incorporated between the cell electrodes;

FIG. 3 is an alternative cell construction wherein the cell electrodes are formed as an interlacing, raster-type grid with the phosphor and dielectric positioned between the individual spaced conductors which form the cell electrodes;

FIG. 4 is a flow chart illustrating the method steps which are used in forming the phosphor-dielectric for the present cells.

With specific reference to the form of the invention illustrated in the drawings, the numeral 10 in FIG. 1 illustrates generally an electroluminescent cell comprising a first light-transmitting electrode 12, a phosphor-dielectric layer 14 thereover and a second electrode 16 over the phosphor-dielectric layer 14. The electrodes 12 and 16 are adapted to have an alternating potential applied thereacross. As a specific example, the electrode 12 can be formed of a light-transmitting tin oxide layer on a glass foundation 18. The second electrode 16 can be formed of vacuum-metallized aluminum or, alternatively, two spaced light-transmitting electrodes formed of tin oxide can be used and the phosphor-dielectric included therebetween. As another embodiment, a metal substrate which serves as one electrode could be used to replace the electrode 12 and the phosphor-dielectric layer 14 formed directly thereon. The light-transmitting electrode could then be formed directly on the phosphor-dielectric layer 14 by conventional techniques. The phosphor-dielectric layer 14 comprises a plurality of finely-divided electroluminescent particles 20 embedded in dielectric material. As will be explained in greater detail hereinafter, the phosphor particles 20 are individually encased by material 22 having a dielectric constant which is substantially higher than the dielectric constant of the phosphor particles. These encased phosphor particles are embedded in additional light-transmitting dielectric material 24. As a matter of practice, this additional light-transmitting dielectric material will have a dielectric constant somewhat lower than the dielectric constant of the phosphor particles. Any electroluminescent phosphor can be used in the present cell, such as zinc sulfide activated by copper and coactivated by chlorine. For a listing of other electroluminescent phosphors see Destriau and Ivey article in Proceedings of the I.R.E., vol. 43, No. 12, pages 1911 to 1940 (December 1955). As an example, one part by weight of phosphor particles can be used for every four parts by weight of embedding dielectric material although this ratio by weight is not critical and can be varied over a wide range. The thickness of the phosphor-dielectric layer 14 is subject to considerable variation, but as an example, the layer 14 has a thickness of approximately two mils.

In FIG. 2 is shown a cell embodiment 10a which corresponds to the cell 10 as shown in FIG. 1 except that an additional layer 26 of material having a very high dielectric constant and high electrical puncture strength such as a layer of barium titanate or titanium dioxide is also included between the cell electrodes 12 and 16. This additional layer 26 allows the voltage which can be applied between the cell electrodes 12 and 16 to be increased considerably. Because of the very high dielectric constant of the additional layer 26, however, the electric field drop thereacross is quite small and the electric field which is impressed across the phosphor particles can be increased accordingly.

In FIG. 3 is shown an alternative cell construction 10b wherein the cell electrodes 28 and 30 are formed as interlacing spaced wires or strips, such as disclosed in U.S. Patent No. 2,684,450, dated July 20, 1954. The phosphor-dielectric layer 14b is included between the spaced electrode strips.

In accordance with the present invention, individual electroluminescent phosphor particles are encased by material which has a dielectric constant considerably higher than the dielectric constant of the phosphor particles. In order to produce such a structure, it is necessary to form the layer 14 or 14b of phosphor-dielectric so that during firing, the very high dielectric constant material precipitates from a glass frit onto the electroluminescent phosphor particles. The preferred material which is used to encase the phosphor particles is barium titanate and this material has been reported to have a dielectric constant as high as 7,000. The dielectric constant of the usual electroluminescent phosphor during operation of the cell is about 15 or even higher. In forming the phosphor-dielectric layer 14 or 14b such as illustrated and described hereinbefore, the dielectric mix must be specially chosen to deposit material such as barium titanate therefrom when the phosphor and dielectric are fired. The dielectric mix must also be capable of depositing the very high dielectric constant, light-transmitting material therefrom and forming a continuous, light-transmitting glass layer when fired at a temperature below that temperature which will damage the phosphor particles. The usual firing temperature used in preparing electroluminescent phosphor material is from 800° C. to 1100° C. and to insure that the electroluminescent phosphor is not damaged when the phosphor and glass frit are fired, it is desirable to limit the firing temperature to 700° C. or less in the case of zinc sulfide phosphor activated by copper and coactivated by chlorine. This limiting temperature will vary with the phosphor material which is incorporated into the cell. Following is a specific frit which is suitable for preparing a cell in accordance with the present invention.

| Constituents | Permissible composition (percent by weight) | Preferred composition (percent by weight) |
| --- | --- | --- |
| ZnO | About 15 | 15.4 |
| BaO | About 31.7 | 32 |
| $B_2O_3$ | About 19 | 19.1 |
| $SiO_2$ | About 4.0 | 4.0 |
| $K_2O$ | About 8 | 7.7 |
| $Na_2O$ | About 4 | 3.8 |
| $Li_2O$ | About 1 | 1.3 |
| $Al_2O_3$ | About 3.9 | 4 |
| $TiO_2$ | About 11 | 11.2 |
| $Sb_2O_3$ | About 1.9 | 2 |

The foregoing frit is first prepared in conventional fashion by smelting the components comprising the frit at a temperature of about 1200° C. for from one-half hour to one hour, pouring the resulting melt onto a cold stainless steel plate, pulverizing the quenched material and sieving same to remove overly-large particles. The state of division of the finely-divided frit is not critical, but as an example, it can be sieved through a No. 325 mesh screen. In the initial smelting to form the frit, the usual glass-forming compounds can be used in place of some of the indicated oxides, maintaining an equivalent oxide content. As an example, sodium oxide can be introduced by soda ash, barium, potassium and lithium oxides can be introduced as carbonates and boron oxide can be introduced as boric acid or borax. A glass wherein the proportions by weight of $K_2O$ to $Na_2O$ to $Li_2O$ are 8:4:1 is disclosed in copending application S.N. 816,405, filed May 28, 1959, by N. F. Cerulli, the inventor herein, and owned by the present assignee. In accordance with the present invention, the glass disclosed in the foregoing application has been modified to deposit the high-dielectric-constant material therefrom.

As an example, four parts by weight of the foregoing glass frit in finely-divided form are mixed with one part by weight of finely-divided electroluminescent phosphor having an average particle size of twelve microns. This phosphor-frit mix is fired at a temperature of about 620° C. for about five minutes. During this firing, barium titanate deposits from the glass frit and forms about the phosphor particles, which serve as "seeds" or nucleation centers. Crystallization and deposition of the barium titanate thus actually takes place at the phosphor particle surfaces. The foregoing firing schedule is subject to considerable variation as is the percent by weight of phosphor with respect to the amount of glass frit which is used. If less phosphor is used and the material is fired for a longer time, a greater amount of barium titanate will be deposited onto the phosphor particle surfaces. The foregoing phosphor-frit mix is preferably fired in situ on the continuous or grid-type electrode to form the layers 14 or 14b. After cooling, the second electrode, if required, is vacuum metallized in place. As indicated hereinbefore, the foregoing phosphor-frit mix could be fired in situ on a heavy metal substrate which would serve as one electrode and a light-transmitting electrode formed thereover after firing.

The deposited light-transmitting material which has a very high dielectric constant and which surrounds the individual phosphor particles has a dual beneficial effect. First, this deposited material displaces an equivalent amount of glass material having a lower dielectric constant so that the overall effect is to cause less field loss in the embedding dielectric material. Second, the very high dielectric constant layer which surrounds the phosphor particles tends to compress the electric field at that point so that more of the applied field passes through the phosphor particles. This in turn increases the brightness of the electroluminescent cell. In actual tests, the cell of the present invention could be operated with a brightness approximately twice that realized over the brightness of a cell otherwise similar but fabricated without the very high dielectric constant material encasing individual phosphor particles.

If it is desired to increase the brightness still more, an additional layer of barium titanate or titania or even a high electrical breakdown layer formed of another suitable material can also be incorporated between the cell electrodes, as shown in FIG. 2. Such an additional layer 26 can be applied by conventional techniques on to the phosphor-dielectric layer 14 after it is formed. In this manner, the voltage which is applied to the cell electrodes can be increased considerably without incurring electrical breakdown between the cell electrodes to increase still further the electric field which is applied across the phosphor particles.

While the foregoing specific example of glass dielectric is very satisfactory, it should be understood that other glasses which behave in a similar manner can be substituted therefor.

It will be recognized that the objects of the invention have been achieved by providing an electroluminescent cell having increased light output and wherein the electrical field which is developed across individual phosphor particles can be increased. In addition, there has been provided a method for forming a light-transmitting phosphor-dielectric layer suitable for use in an electroluminescent cell wherein the field which is applied across the phosphor particles can be increased. A specific glass frit which will deposit high dielectric constant material onto seeds or nucleation centers during the firing of this frit has also been provided.

While a best embodiment of the invention has been illustrated and described hereinbefore, it is to be particularly understood that the invention is not limited thereto or thereby.

I claim:

1. An electroluminescent cell comprising, spaced electrodes, finely-divided electroluminescent phosphor particles included between said spaced electrodes, said phosphor particles individually encased by barium titanate, and said encased phosphor particles embedded in additional light-transmitting glass dielectric material.

2. A glass frit composition suitable for depositing a barium titanate layer about finely-divided impurity particles contained therein, said glass frit having the following composition as expressed by weight: about 15% ZnO, about 32% BaO, about 19% $B_2O_3$, about 4% $SiO_2$, about 8% $K_2O$, about 4% $Na_2O$, about 1% $Li_2O$, about 4% $Al_2O_3$, about 11% $TiO_2$ and about 2% $Sb_2O_3$.

3. A glass frit composition suitable for depositing a barium titanate layer about finely-divided impurity particles contained therein, said glass frit having the following composition as expressed by weight: 15.4% ZnO, 31.7% BaO, 19.1% $B_2O_3$, 4.0% $SiO_2$, 7.7% $K_2O$, 3.8% $Na_2O$, 1.3% $Li_2O$, 3.9% $Al_2O_3$, 11.2% $TiO_2$ and 1.9% $Sb_2O_3$.

4. The method of forming a layer of light-transmitting dielectric material having embedded therein finely-divided electroluminescent phosphor particles which are individually encased by barium titanate, which method comprises, mixing finely-divided phosphor particles and finely-divided glass frit material which when fired for a predetermined time at a predetermined temperature below that which will damage said mixed phosphor particles will form a continuous light-transmitting layer and deposit barium titanate therefrom, and heating said mixed glass frit material and phosphor particles at said predetermined temperature and for a predetermined time to cause barium titanate to deposit from said glass frit material about said mixed phosphor particles and to cause remaining undeposited glass frit material to form a continuous phosphor-particle-embedded layer.

5. The method of forming a layer of light-transmitting ceramic having embedded therein finely-divided electroluminescent phosphor particles which are individually encased by barium titanate, which method comprises: mixing finely-divided phosphor particles and finely-divided glass frit material having the following composition as expressed in proportions by weight: about 15% ZnO, about 32% BaO, about 19% $B_2O_3$, about 4% $SiO_2$, about 8% $K_2O$, about 4% $Na_2O$, about 1% $Li_2O$, about 4% $Al_2O_3$, about 11% $TiO_2$ and about 2% $Sb_2O_3$; and heating said mixed glass frit material and phosphor particles at a predetermined temperature and for a predetermined time to cause barium titanate to deposit from said glass frit material about said mixed phosphor particles and to cause remaining undeposited glass frit material to form a continuous phosphor-particle-embedded layer.

References Cited in the file of this patent

UNITED STATES PATENTS

| | | |
|---|---|---|
| 2,824,992 | Bouchard | Feb. 25, 1958 |
| 2,887,601 | Bain | May 19, 1959 |
| 2,894,854 | MacIntyre | July 14, 1959 |